United States Patent
Weedmark et al.

(10) Patent No.: US 7,872,966 B2
(45) Date of Patent: Jan. 18, 2011

(54) PROTECTED AND HIGH AVAILABILITY PATHS USING DBR REROUTE PATHS

(75) Inventors: Michael Ellsworth Weedmark, Dunrobin (CA); Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 877 days.

(21) Appl. No.: 10/699,786

(22) Filed: Nov. 4, 2003

(65) Prior Publication Data

US 2005/0094555 A1    May 5, 2005

(51) Int. Cl.
*H04J 1/16* (2006.01)
(52) U.S. Cl. .................... 370/225; 370/228; 370/395.21
(58) Field of Classification Search ............... 370/228, 370/225, 229, 235, 252, 395.21, 395.1
See application file for complete search history.

(56) References Cited

U.S. PATENT DOCUMENTS

| 6,111,881 | A | * | 8/2000 | Soncodi | .................. 370/395.32 |
| 6,442,132 | B1 | | 8/2002 | Burns et al. | |

FOREIGN PATENT DOCUMENTS

| JP | 2002033738 | | 1/2002 |
| WO | WO 9849862 | * | 11/1998 |
| WO | WO 99/49693 | | 8/1999 |
| WO | WO 00/16504 | | 8/2000 |
| WO | WO 03/003156 | | 1/2003 |

OTHER PUBLICATIONS

Modification procedures for sustainable cell rate parameters, International Telecommunication Union, ITU-T Q.2963.2, Sep. 1997.
ATM Traffic descripto modification with negotiation by the connection owner, International Telecommunication Union, ITU-T Q.2963.3, May 1998.
Peak cell rate modification by the connection owner, International Telecommunication Union, ITU-T Q.2963.1, Dec. 1999.
Modification of Traffic Parameters for an Active Connection . . . , ATM Forum Technical Committee, AF-CS-0148.001, May 2001.

* cited by examiner

*Primary Examiner*—Jason E Mattis
*Assistant Examiner*—Dady Chery
(74) *Attorney, Agent, or Firm*—Kramer & Amado P.C.

(57) ABSTRACT

A method and apparatus are provided for protecting a connection during implementation of an Active Connection Modify request. Before initiating the ACM request, an alternate connection between the source node and the destination node of the connection are established using Domain-Based Rerouting. The alternate connection may be established in conformance either with the traffic parameters of the existing connection or with the new traffic parameters specified in the ACM request. If the connection along the original connection is to be torn as a result of lost ACM signaling messages, the connection is first switched to the alternate connection in a hitless manner. If the alternate connection is established in conformance with the new traffic parameters, and the ACM request can not be implemented along the original connection, due for example to resource shortage along the original connection, then the connection is switched to the alternate connection in a hitless manner. In this way, connections are protected in the event of lost ACM messages resulting from signal congestion, and the ACM may be implemented even in the event of resource shortage along the original connection.

10 Claims, 4 Drawing Sheets

PROTECTED AND HIGH AVAILABILITY PATHS USING DBR REROUTE PATHS

FIELD OF THE INVENTION

The invention relates to Active Connection Modify actions in communication networks, and more particularly to path protection during such actions.

BACKGROUND OF THE INVENTION

A connection in a connection-oriented communication network follows a path. The connection has associated traffic parameters, referred to as traffic descriptor information including information such as allocated bandwidth. These are normally fixed for the duration of a call. However, there are some circumstances in which the user of the connection may wish to change the traffic parameters without disconnecting the call, in order to leave service unaffected. For example, services are envisioned in which a user may wish to increase bandwidth temporarily in order to download a large file while browsing the Internet, or may wish to increase bandwidth temporarily while playing an on-line game, without having to interrupt service by disconnecting and reconnecting the call with new traffic parameters.

Active Connection Modify (ACM) actions permit such modifications to the traffic parameters of an existing connection. A user initiates an ACM, which is received as an ACM request by the source node of the connection. The source node then attempts the ACM request using the signaling mechanisms defined in ITU-T Recommendations Q.2963.1, Q.2963.2, and Q.2963.3, each of which is referred to in ATM specification af-cs-0148.000, "Modification of Traffic Descriptor for an Active Connection, Addendum to UNI 4.0/PNNI 1.0/AINI", The ATM Forum Technical Committee, July 2000.

When a source node receives an ACM request from a user, the source node starts a T360 timer, reserves resources associated with the ACM request, and sends a MODIFY REQUEST message (MOD REQ) to the next node along the connection. If the next node can accommodate the ACM request (for example, has sufficient available bandwidth to accommodate a bandwidth increase requested by the user), the resources for the MOD REQ are reserved and the node passes the MOD REQ on to the next node. This continues until the destination node receives the MOD REQ. If the destination node can accommodate the ACM request, the destination node implements the ACM request and passes a MODIFY ACKNOWLEDGE message (MOD ACK) to the preceding node. Each node in the connection that receives the MOD ACK implements the connection modification by allowing data to be transmitted at the new traffic parameter values (resources for which having been reserved upon receipt of the MOD REQ), and forwards the MOD ACK to its preceding node, until finally the source node receives the MOD ACK and implements the ACM request.

However, a node that receives a MOD REQ may not be able to implement the ACM request. For example, the node may have no additional unused bandwidth available on the connection to reserve for the connection. If a node cannot implement the ACM request, the node sends a MODIFY REJECT message (MOD REJ) back to the preceding node. The MOD REJ is forwarded back along the connection until it reaches the source node. When the source node receives the MOD REJ, the ACM request is therefore not implemented, the traffic parameters of the connection remain unchanged, and the user is notified that the ACM failed.

Some nodes may also generate a RELEASE in response to a MOD ACK being propagated back along the connection from the destination node to the source node, although there is a low probability of this happening since nodes should be reserving sufficient and correct resources during propagation of the MOD REQ. For example, resources that were available to accommodate the ACM request while the MOD REQ was being passed forward along the connection may no longer be available when the MOD ACK is received on its way back to the source node. In such a case the node at which there are no longer sufficient resources to implement the connection modification sends a RELEASE message in each direction, towards the source node and towards the destination node, and the call is released.

Any of the MOD REQ, the MOD ACK, and the MOD REJ may be lost due to congestion in the control plane, as described in af-cs-0181.000, "Signaling Congestion Control, Version 1.0", The ATM Forum Technical Committee, April 2002. A MOD REQ may also be lost if a node along the connection does not support ACM. In either case, since the source node does not receive a MOD ACK or a MOD REJ the timer started by the source node will eventually expire. If the timer at the source node expires, the source node tears down the existing connection by sending a RELEASE message. The connection is torn down because the lack of receipt of a MOD ACK or a MOD REJ means that the source node does not know what has happened at other nodes along the connection. For example, some nodes may have increased the bandwidth allocated to the connection. After the existing connection is torn down a new connection may be established by the source node, but this re-establishment of the connection is not hitless in that there is a noticeable delay to the user and an interruption of traffic and service. A "hitless" switch to a new connection is usually defined as occurring within 50 ms.

One problem with the ACM signaling described above is that a user who makes an ACM request in which one of the ACM messages (MOD REQ, MOD ACK, or MOD REJ) gets lost due to congestion in the control plane may prefer that traffic on the connection remain unaffected. Given the current behaviors outlined in the procedures for ACM, a user cannot be provided with unaffected traffic during a connection modification. It would be desirable for such users to be able to maintain the connection or some variant thereof at the original traffic parameters even if the ACM request (and related messages) are lost, rather than suffering a noticeable data hit when rerouting to a new connection on a failure. This is particularly worrisome for Soft Permanent Virtual Circuits that are expected to never go down and to never lose traffic.

A second problem with the ACM signaling described above is that ACM requests may not be possible in a large number of currently deployed networks. Some carriers arrange connections on links so as to pack each link in turn before assigning new connections to a parallel link between the same two nodes. An ACM request for additional bandwidth for a connection along a packed link will likely result in an MOD REJ, since there is little or no additional bandwidth along the connection to allocate as new resources to the connection. There may be plenty of traffic resources available on a parallel link which could accommodate the user's ACM request, but these resources are not accessible given the current ACM behaviors.

A method of implementing ACM which minimized the likelihood of ACM rejections and which minimized the likelihood of releasing connections during an ACM request would provide improved ACM service.

SUMMARY OF THE INVENTION

In accordance with one aspect of the invention, a method is provided for implementing an Active Connection Modify (ACM) for a connection in a communication system, the connection initially lying along an original connection between a source node and a destination node, the original connection conforming with at least one original traffic parameter. An alternate connection is established between the source node and the destination node. Implementation of the ACM is attempted along the original connection. It is determined whether the connection along the original connection must be torn down. If the connection along the original connection must be torn down, the connection is switched to the alternate connection before tearing down the connection along the original connection.

In one embodiment, the ACM is one of a protected ACM and a protected and enabling ACM, a protected ACM being one where the connection is to be maintained even if only in conformance with the at least one original traffic parameter, a protected and enabling ACM being one where the connection must be adapted to conform to at least one new traffic parameter specified by the ACM. It is determined whether the ACM is a protected ACM and whether the ACM is a protected and enabling ACM. If the ACM is a protected ACM the alternate connection is established in conformance with the original traffic parameters. If the ACM is a protected and enabling ACM the alternate connection is established in conformance with the new traffic parameters.

In accordance with another aspect of the invention, a method is provided for implementing an Active Connection Modify (ACM) for a connection in a communication system, the connection initially lying along an original connection between a source node and a destination node, the original connection conforming with at least one original traffic parameter. An ACM request is received from a user. It is determined whether the ACM request includes a request that the connection be protected. If the ACM request includes a request that the connection be protected, an alternate connection is established between the source node and the destination node. Implementation of the ACM is attempted along the original connection. It is determined whether the connection along the original connection must be torn down. If the connection along the original connection must be torn down and if the connection is to be protected, the connection is switched to the alternate connection before tearing down the connection along the original connection.

In one embodiment, if the connection is to be protected the ACM is one of a protected ACM and a protected and enabling ACM, a protected ACM being one where the connection is to be maintained even if only in conformance with at least one original traffic parameter, a protected and enabling ACM being one where the connection must be adapted to conform to at least one new traffic parameter specified by the ACM. If the ACM request includes a request that the connection be protected, it is determined whether the ACM is a protected ACM and whether the ACM is a protected and enabling ACM. If the ACM is a protected ACM the alternate connection is established in conformance with the original traffic parameters. If the ACM is a protected and enabling ACM the alternate connection is established in conformance with the new traffic parameters.

The method and apparatus of the present invention allows for improved ACM service. By using DBR to establish an alternate connection before launching an ACM REQ along the existing connection, the source node can offer connection protection during ACM procedures. In the event that the existing connection is to be torn down due to the procedures outlined in the ACM specifications, the source node can switch the connection to the alternate connection in a hitless manner, that is, within 50 ms. The alternate connection can be created using the traffic parameters of the existing connection in order to provide connection protection. Alternatively the alternate connection can be created using the new traffic parameters requested by the user in the ACM request, in order to provide both connection protection and enabling in the event that the MOD REQ is rejected with a MOD REJ. The latter case also provides the advantage of considering connections other than the existing connection when determining whether the ACM request can be accommodated, thereby overcoming perceived resource shortages in networks that contain links that are 100% utilized.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
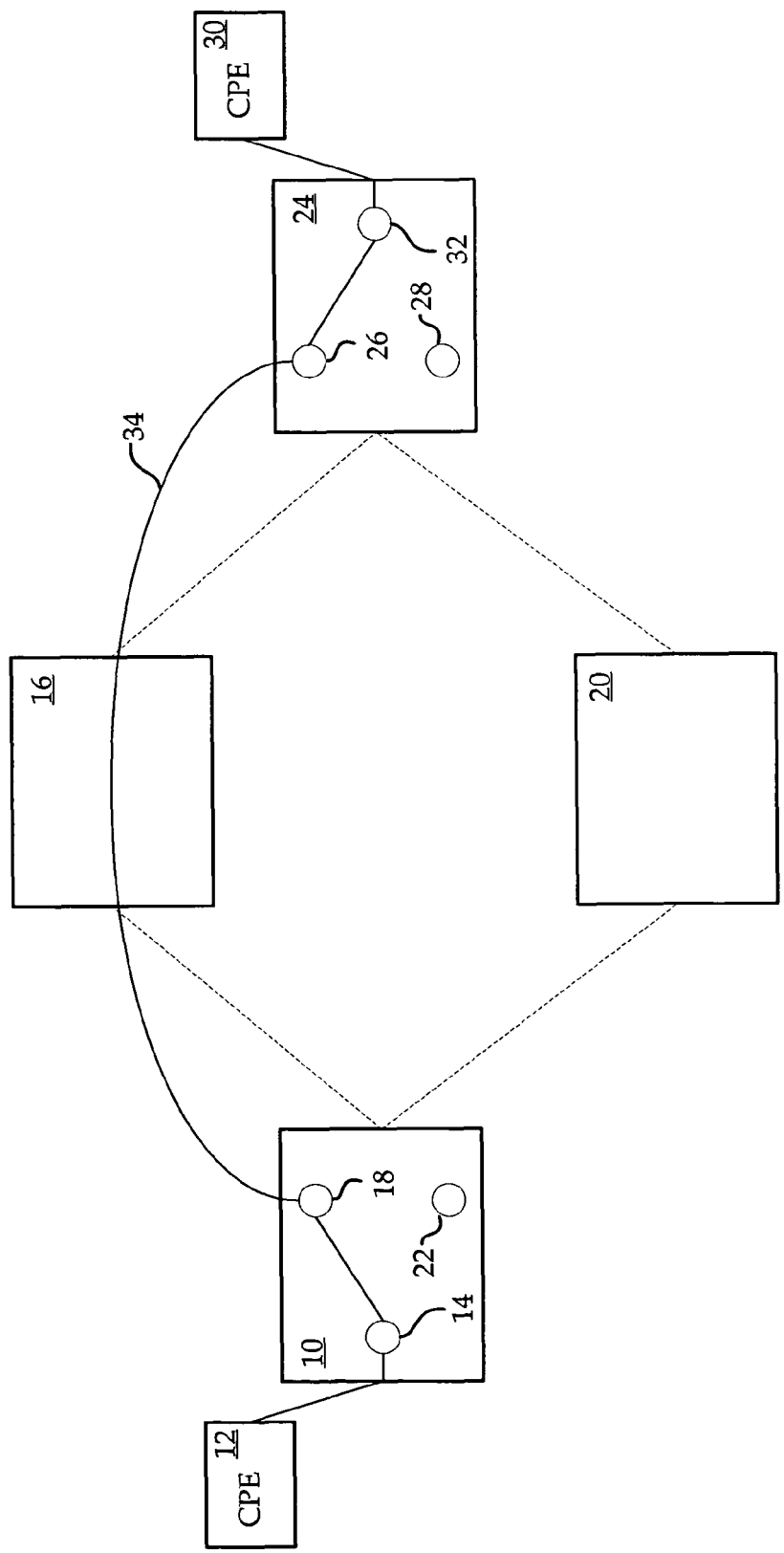
FIG. 1 is a block diagram of an example communication network in which a connection has been established along a path.

Referring to FIG. 1, a block diagram of a portion of an example communication network is shown. The communication network includes a source node 10 providing communication access to a user of a customer premises equipment (CPE) 12 through an input line 14. The source node 10 is coupled to a first intermediate node 16 through a first output line 18, and to a second intermediate node 20 through a second output line 22. The first intermediate node 16 and the second intermediate node 20 are each connected to a destination node 24 through a first input line 26 and a second input line 28, respectively, located at the destination node 24. The destination node 24 provides communication access to a CPE 30 through an output line 32. In the example communication network of FIG. 1, a connection has been established along an original connection 34 from the source node to the destination node through the first intermediate node. Associated with the connection is at least one original traffic parameter, including allocated bandwidth. The original connection 34 conforms to the original traffic parameters.

It should be noted that the communication network of FIG. 1 has been simplified for the sake of clarity. Input lines and output lines of the intermediate nodes have not been shown. The communication network has been described as having two intermediate nodes through which a connection can be established between the source node and the destination node. More generally, there are at least two possible connections between the source node and the destination node, each such connection passing either directly from the source node to the destination node or passing through at least one intermediate node. The source node may be connected to the destination node directly, although there may still be more than one connection between the source node and the destination node. There may be more than one intermediate node in a connection between the source node and the destination node. There may be more than two intermediate nodes, each providing a different connection between the source node and the destination node.

The source node 10 includes an ACM controller (not shown in FIG. 1). The ACM controller comprises instructions for processing Active Connection Modify (ACM) requests received at the source node 10 from the user. In the preferred embodiment, the instructions are in the form of software running on a processor, but may more generally be in the form of any combination of software or hardware within a processor, including hardware within an integrated circuit. The processor need not be a single device, but rather the instructions could be located in more than one device. If in the form of software, the instructions could be stored on a computer-readable medium.

An ACM request from the user includes at least one new traffic parameter to be associated with the connection. Each of the at least one new traffic parameter has a matching one of the at least one original traffic parameter, although each of the at least one new traffic parameter has a value different from that of the matching original traffic parameter. In the preferred embodiment of the invention, the ACM request can be one of two types. A protected ACM request is one for which the user wishes to maintain a connection even at the original traffic parameters if an attempt at implementing the new traffic parameters results in tearing down of the original connection. A protected and enabling ACM request is one for which the user wishes to maintain a connection if an attempt at implementing the new traffic parameters results in tearing down of the original connection, but for which the user insists that the resulting connection have the new traffic parameters. The type of ACM request is specified by the user as part of the ACM request. These two types of ACM requests will be made more clear with reference to FIG. 2 below.

Broadly, the ACM controller receives an ACM request from the user. Upon receipt of an ACM request, the ACM controller establishes an alternate between the source node and the destination node using Domain Based Rerouting (DBR) (af-cs-0173.000, "Domain-based rerouting for active point-to-point calls, Version 1.0", The ATM Forum Technical Committee, August 2001). If the ACM request is a protected ACM request, the alternate connection is established using the original traffic parameters. If the ACM request is a protected and enabling ACM request, the alternate connection is established using the new traffic parameters specified within the ACM request. The ACM controller attempts to implement the ACM request along the original connection. If the ACM request results in the original connection being torn down, the ACM controller switches the connection to the alternate connection before tearing down the original connection. The ACM controller also switches the connection to the alternate connection if the ACM request cannot be implemented on the original connection and the user has requested a protected and enabling ACM request.

Figure 2:
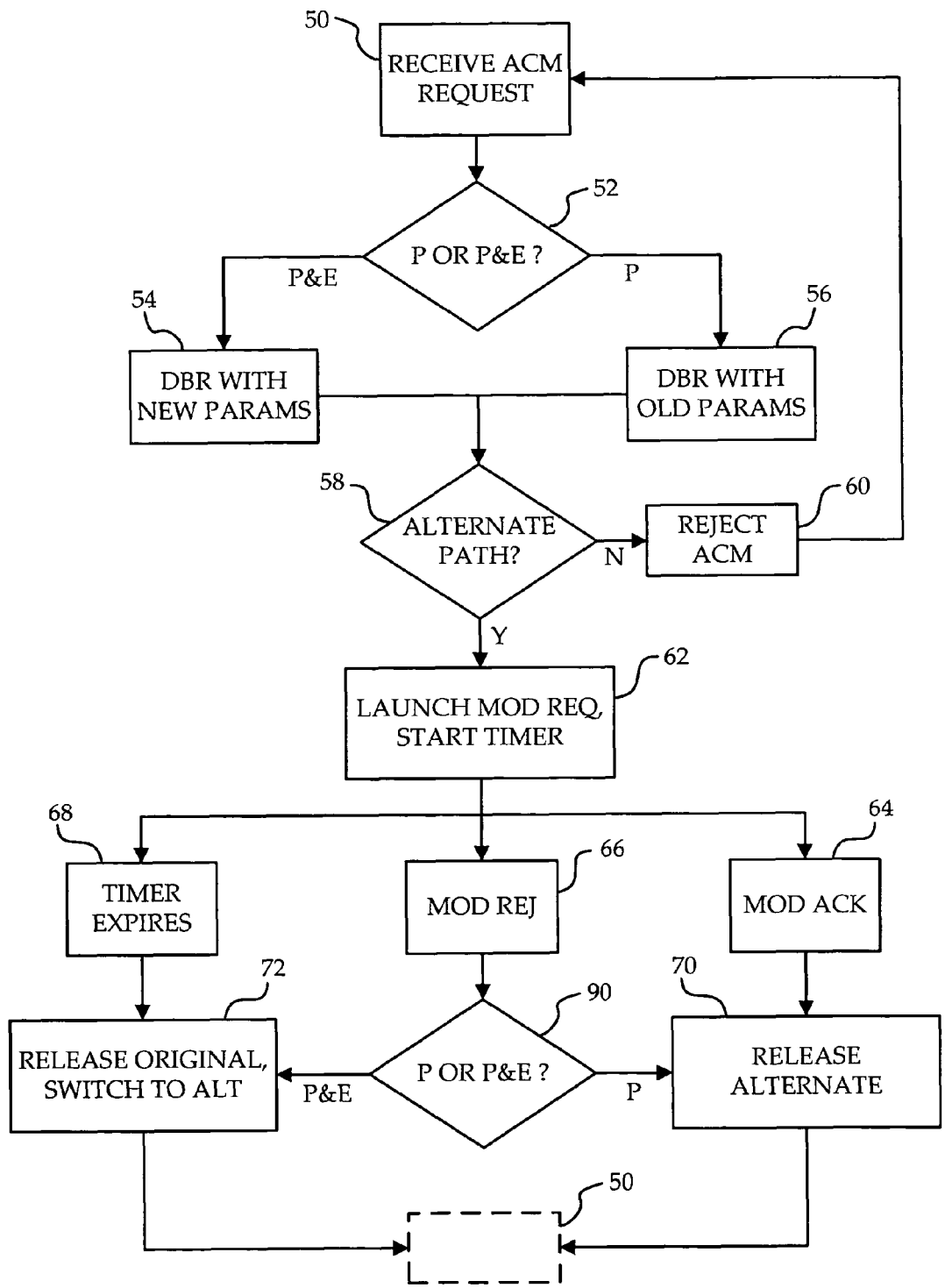
FIG. 2 is a flowchart of a method by which an ACM controller within the source node of the communication network of FIG. 1 processes an ACM request according to one embodiment of the invention.

Referring to FIG. 2, a flowchart of a method by which the ACM controller processes ACM requests according to one embodiment of the invention is shown. The ACM controller receives an ACM request from the user at step 50. At step 52 the ACM controller determines whether the ACM request is a protected and enabling ACM request or a protected ACM request. The logic of step 52 is intended to determine whether the ACM request is a protected ACM request or a protected and enabling ACM request, and may be carried out in any way, such as a simple Boolean determination of whether the ACM request is a protected and enabling ACM request. If the ACM request is a protected and enabling ACM request, then at step 54 the ACM controller attempts to establish an alternate connection between the source node and the destination node using DBR, the alternate connection conforming with the new traffic parameters specified in the ACM request. If the ACM controller determines at step 52 that the ACM request is a protected ACM request, then at step 56 the ACM controller attempts to establish an alternate connection as at step 54, but the alternate connection conforms with the original traffic parameters. For either a protected ACM request or a protected and enabling ACM request, the ACM controller determines at step 58 whether an alternate connection was established. If no alternate connection was established, then the ACM request is rejected and the user is notified of the rejection at step 60. The connection is maintained along the original connection, and the ACM controller awaits receipt of another ACM request at step 50.

If an alternate connection was established at step 54 or 56, then at step 62 the ACM controller initiates a timer and launches a MODIFY REQUEST-message (MOD REQ) to the downstream node along the original connection. One of three events will then occur. First, the source node may receive a MODIFY ACKNOWLEDGE message (MOD ACK) at event 64 from the downstream node on the original connection before expiry of the timer. Second, the source node may receive a MODIFY REJECT message (MOD REJ) at event 66 from the downstream node on the original connection before expiry of the timer. Third, the timer may expire at event 68 before receipt of a MOD ACK or a MOD REJ (or more generally an ACM-related message) at the source node.

If the source node receives a MOD ACK at event 64, then the ACM was successfully implemented on the original connection, and the ACM controller drops the alternate connection at step 70. The ACM controller then awaits receipt of another ACM request at step 50.

Figure 3A:
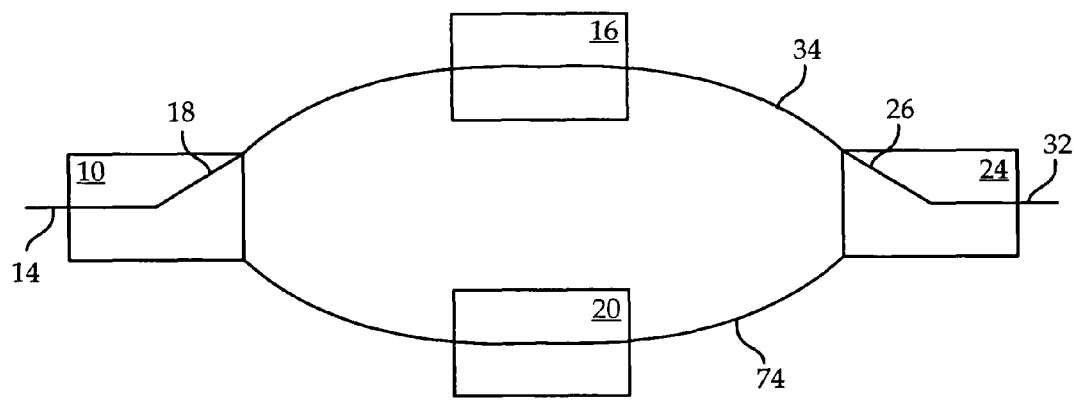
FIG. 3 is a block diagram of the communication network of FIG. 1 during switching of a connection to an alternate connection.
Figure 3B:
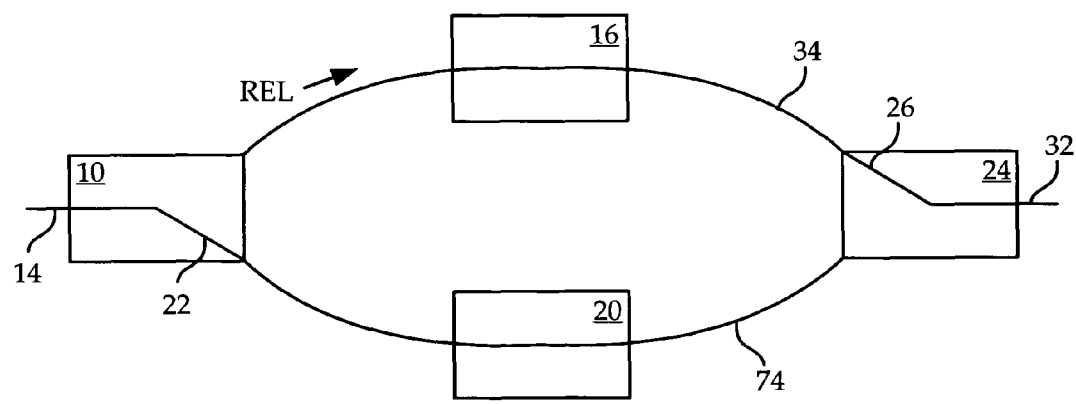

If the timer expires at event 68, then something has gone wrong along the original connection while attempting to implement the ACM request. The ACM controller performs a hitless (typically, under 50 ms) switch of the connection to the alternate connection, releasing the original connection in doing so, at step 72. Referring to FIG. 3, a sequence of simplified block diagrams of the communication network of FIG. 1 is shown. In FIG. 3A, the alternate connection 74 has been established, but the connection still lies along the original connection 34. The source node 10 connects the input line 14 with the first output line 18 leading to the first intermediate node 16, and the destination node 24 connects the first input line 26 leading from the first intermediate node 16 to the output line 32. In FIG. 3B the ACM controller instructs the source node 10 to connect the input line 14 with the second output line 22 leading to the second intermediate node 20, and sends a RELEASE signal to the first intermediate node 16. Traffic along the connection begins flowing to the second intermediate node 20.

Figure 3C:
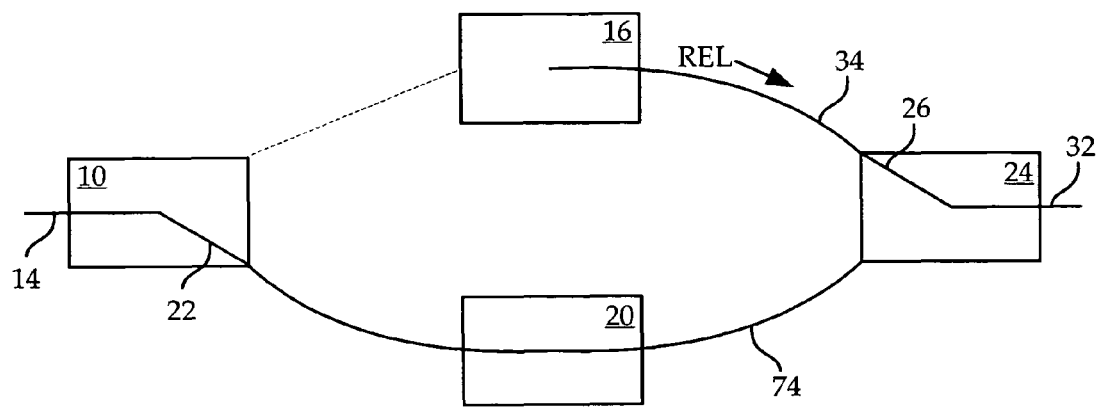
Figure 3D:
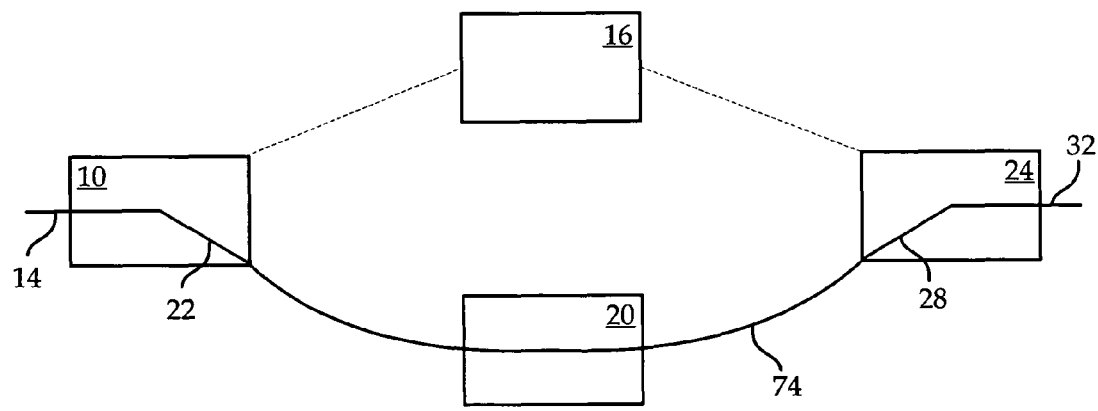

In FIG. 3C the portion of the original connection between the source node 10 and the first intermediate node 16 has been torn down, and the RELEASE signal has been forwarded by the first intermediate node 16 to the destination node 24. The destination node 24 still connects the first input line 26 to the output line 32, because the destination node 24 has not yet received the RELEASE signal. Finally, in FIG. 3D the second leg of the original connection has been torn down, and the destination node 24 connects the second input line 28 leading from the second intermediate node 20 with the output line 32, and switching of the connection to the alternate connection is complete.

Returning to FIG. 2, if the ACM controller receives a MOD REJ at event 66, then the ACM request could not be implemented on the original connection. However, there have been no signaling errors, and none of the nodes along the original connection have attempted to implement the ACM request. The ACM controller determines at step 90 whether the ACM request is a protected and enabling ACM request or is a protected ACM request. The ACM controller may do so in the same way as was done at step 52, or may simply read a flag set at step 52. If the ACM controller determines that the ACM request is a protected and enabling ACM request, then the user has insisted that the new traffic parameters are to be used. Since the ACM request could not be implemented on the original connection but the alternate connection was established at step 54 using the new traffic parameters, the ACM controller hitlessly switches the connection to the alternate connection and releases the original connection at step 72, in the same manner as was described above with reference to FIG. 3.

If the ACM controller determines at step 90 that the ACM request was a protected ACM request, then the user has simply requested that the connection not be dropped, even if the old traffic parameters need to be used. The ACM controller tears down the alternate connection at step 70, maintaining the connection along the original connection.

The invention has been described as requiring a user to specify that an ACM request is a protected ACM request or a protected and enabling ACM request, in other words, the user requests that the connection be protected in one form or the other. Numerous alternatives are possible. The ACM controller may also determine whether an ACM request received from the user is a traditional ACM request. Such an ACM request would be treated as is done in the prior art, that is, no alternate connection would be established before attempting to implement the ACM. The ACM controller may support any combination or subset of traditional ACM requests, protected ACM requests, and protected and enabling ACM requests, other than traditional ACM requests alone. For each of these combinations of supported types of ACM requests, the ACM controller may require the user to specify a type of ACM request when making an ACM request. Alternatively, the ACM controller may treat unspecified types as a default type of ACM request, the default type of ACM request being either a traditional ACM request, a protected ACM request, or a protected and enabling ACM request. If the default type of ACM request is the traditional ACM request, then the invention allows the user to request protection of the connection (either as a protected ACM or a protected and enabling ACM), but if the user makes no such request then the source node implements the ACM request without first establishing an alternate connection. The step 52 of determining the type of ACM request would be adjusted accordingly, depending on which ACM request types were supported and depending on whether a default type of ACM request was supported.

The embodiments presented are exemplary only and persons skilled in the art would appreciate that variations to the above described embodiments may be made without departing from the spirit of the invention. Methods which are logically equivalent or similar to the method described above with reference to FIG. 2 may be used to implement the methods of the invention. For example, the two steps 52 and 90 of determining whether the ACM request is a protected and enabling ACM request may be combined into one step at the beginning of the method, and resulting in two very similar but separate subsequent series of steps. The scope of the invention is solely defined by the appended claims.

We claim:

1. A method of using Domain-Based Rerouting (DBR) with Active Connection Modify (ACM) for a connection in a communication system, the connection initially lying along an original connection between a source node and a destination node, the original connection conforming with at least one original traffic parameter, the method comprising:
receiving, in an ACM controller, an ACM request from a user;
determining whether the received ACM request is either a protected ACM request or a protected and enabling (P&E) ACM request;
when the received ACM request is the P&E ACM request, establishing an alternate connection between the source node and the destination node using DBR, wherein the alternate connection conforms to new traffic parameters in the received ACM request;
when the received ACM request is the protected ACM request, establishing the alternate connection between the source node and the destination node using DBR, wherein the alternate connection conforms to original traffic parameters;
determining whether the alternate connection was actually established;
when the alternate connection was actually established, monitoring for receipt of a MODIFY REJECT (MOD REJ) message at the source node;
when a MODIFY REJECT message is received at the source node, determining whether the received ACM request is either the protected ACM request or the P&E ACM request;
when the received ACM request is the P&E ACM request, switching to the alternate connection and tearing down the original connection; and
when the received ACM request is the protected ACM request, maintaining the original connection and tearing down the alternate connection.

2. The method of claim 1, further comprising:
when no alternate connection was established, rejecting the ACM request.

3. The method of claim 2, further comprising:
after rejecting the ACM request, informing the user that the ACM request was rejected.

4. The method of claim 1, further comprising:
initiating a timer with the ACM controller.

5. The method of claim 4, further comprising:
launching a MODIFY REQUEST (MOD REQ) message to a downstream node along the original connection.

6. The method of claim 4, further comprising:
when receiving a MODIFY ACKNOWLEDGE (MOD ACK) message before expiry of the timer, dropping the alternate connection.

7. The method of claim 4, further comprising:
when expiry of the timer occurs before receipt of any ACM-related messages at the source node, performing a hitless switch with the ACM controller to the alternate connection.

8. The method of claim 1, wherein the communication system has at least one intermediate node between the source node and the destination node.

9. The method of claim 8, wherein the communication system has at least two intermediate nodes between the source node and the destination node.

10. The method of claim 9, wherein each intermediate node provides a different connection between the source node and the destination node.

* * * * *